No. 880,043. PATENTED FEB. 25, 1908.
E. C. ROLFE.
HOPPLE FOR FOWLS.
APPLICATION FILED APR. 1, 1907.

Witnesses
C. E. Smith.
C. H. Griesbauer

Inventor
Ernest C. Rolfe.
by H. B. Willson & Co
Attorneys

UNITED STATES PATENT OFFICE.

ERNEST C. ROLFE, OF MEMPHIS, TENNESSEE.

HOPPLE FOR FOWLS.

No. 880,043.     Specification of Letters Patent.     Patented Feb. 25, 1908.

Application filed April 1, 1907. Serial No. 365,822.

*To all whom it may concern:*

Be it known that I, ERNEST C. ROLFE, a citizen of the United States, residing at Memphis, in the county of Shelby and State of Tennessee, have invented certain new and useful Improvements in Hopples for Fowls; and I do declare the following to be a full, clear, and exact description of the invention, such as will enable others skilled in the art to which it appertains to make and use the same.

This invention relates to improvements in hopples for fowls.

The object of the invention is to provide a device of this character adapted to be applied to the wing of a fowl to prevent the latter from flying.

With this object in view, the invention consists of certain novel features of construction, combination and arrangement of parts as will be more fully described and particularly pointed out in the appended claims.

Figure 1:
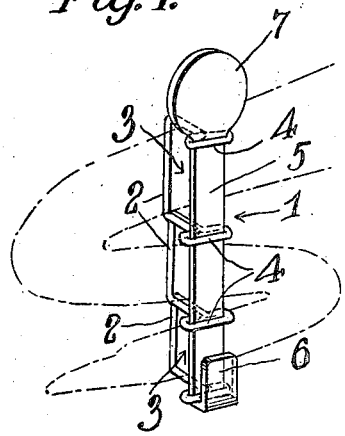
Figure 2:
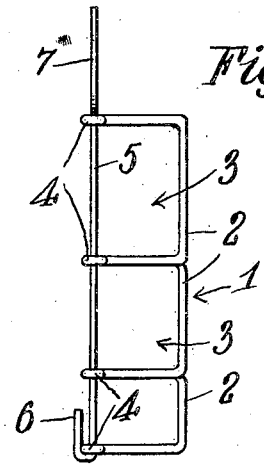
Figure 3:
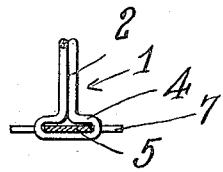
Figure 4:
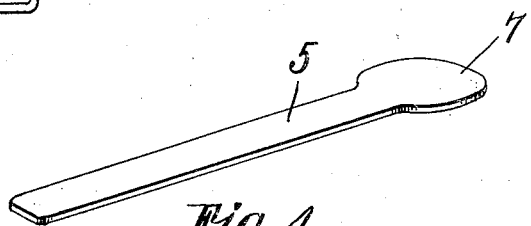

In the accompanying drawings, Figure 1 is a perspective view of the hopple, showing the manner in which the same is applied to a wing; the latter being shown in dotted lines; Fig. 2 is a side view of the hopple; Fig. 3 is a cross sectional view of the same; and Fig. 4 is a perspective view of the fastening bar of the hopple.

Referring more particularly to the drawings, 1 denotes the hopple, which is here shown, and, is, preferably, formed from a wire rod bent to form a series of laterally projecting bars, 2, which provide a series of spaces, 3, to receive the joints of the wing. On the outer end of each of the bars, 2, is formed an elongated eye or loop, 4, the eyes or loops of said bars being in alinement.

In applying the hopple to the wing of a fowl, the bars, 2, are projected between the feathers of the wing, so that the joints of the latter will be disposed in the spaces, 3, the rods or bars serving to hold the joints of the wing from being spread or opened to a flying position. After the bars have been thus inserted between the joints of the wing, a fastening bar, 5, is inserted above the wing and through the alined loops or eyes, 4, thus holding the hopple in place on the joints of the wing. After the bar, 5, has been inserted through the eyes or loops, 4, the end of said bar is bent back or folded upon itself, as shown at 6, thereby fastening this end of the bar. The opposite end of the bar is provided with an enlarged disk-shaped head, 7, which prevents the disengagement of this end of the bar, 2, from the loops, 4, said head also forming a handle, by means of which the bar may be conveniently inserted through the loops, 4.

By providing a hopple constructed as shown and described herein, the wing of a fowl or bird may be securely pinioned or locked against being opened to a position for flying, thus winging the fowl or bird, and preventing the latter from flying. If desired, the owner's name, or any other data may be suitably recorded upon the fastening bar, 5, which will serve to identify or indicate the ownership of the fowl.

Having thus full described my invention, what I claim as new, and desire to secure by Letters-Patent, is:

1. A hopple for fowls, comprising a frame having a series of spaced bars connected to receive the joints of a wing between them, and means to secure said frame in place, substantially as described.

2. A hopple for fowls, comprising a frame having a series of spaced bars connected to receive the joints of a wing between them, and a fastening bar adapted to be engaged with the outer ends of said spaced bars to hold the hopple on the wing, substantially as described.

3. A hopple for fowls, comprising a frame having a series of spaced bars connected to receive the joints of a wing between them, loops or eyes formed on the outer ends of said spaced bars, a fastening bar adapted to be inserted through the loops or eyes on the end of said spaced bars and doubled over at one end to secure the same in place, and a head on the opposite end of said bar, substantially as described.

In testimony whereof I have hereunto set my hand in presence of two subscribing witnesses.

ERNEST C. ROLFE.

Witnesses:
    CHAS. L. BOTTS,
    FRED ARMANTROUT.